United States Patent
Owaki et al.

(10) Patent No.: US 11,801,573 B2
(45) Date of Patent: Oct. 31, 2023

(54) TACK WELDING METHOD AND TACK WELDING APPARATUS

(71) Applicants: IHI INSPECTION & INSTRUMENTATION CO., LTD., Tokyo (JP); TADANO LTD., Kagawa (JP)

(72) Inventors: Katsura Owaki, Tokyo (JP); Isao Kawaguchi, Kanagawa (JP); Satomi Maki, Kanagawa (JP); Kosei Yamamoto, Kagawa (JP); Hiroki Matsuo, Kagawa (JP)

(73) Assignees: IHI INSPECTION & INSTRUMENTATION CO., LTD., Tokyo (JP); TADANO LTD., Kagawa (JP)

( * ) Notice: Subject to any disclaimer, the term of this patent is extended or adjusted under 35 U.S.C. 154(b) by 42 days.

(21) Appl. No.: 16/640,677

(22) PCT Filed: Aug. 23, 2018

(86) PCT No.: PCT/JP2018/031086
§ 371 (c)(1),
(2) Date: Feb. 20, 2020

(87) PCT Pub. No.: WO2019/039528
PCT Pub. Date: Feb. 28, 2019

(65) Prior Publication Data
US 2020/0361033 A1 Nov. 19, 2020

(30) Foreign Application Priority Data
Aug. 24, 2017 (JP) ................. 2017-160780

(51) Int. Cl.
*B23K 26/21* (2014.01)
*B23K 26/211* (2014.01)
*B23K 101/04* (2006.01)

(52) U.S. Cl.
CPC ............ *B23K 26/21* (2015.10); *B23K 26/211* (2015.10); *B23K 2101/04* (2018.08)

(58) Field of Classification Search
CPC .. B23K 2101/04; B23K 26/082; B23K 26/21; B23K 26/211; B23K 26/22
(Continued)

(56) References Cited

U.S. PATENT DOCUMENTS

| | | | |
|---|---|---|---|
| 6,792,678 B2 * | 9/2004 | Yamada | B23K 26/0823 219/121.64 |
| 2001/0007331 A1 * | 7/2001 | Iwago | B23K 9/038 228/159 |
| 2003/0038120 A1 | 2/2003 | Minamida et al. | |

FOREIGN PATENT DOCUMENTS

| | | | |
|---|---|---|---|
| AU | 734139 | * | 10/1998 |
| CN | 105149786 | * | 12/2015 |

(Continued)

OTHER PUBLICATIONS

EPO; Application No. 18848349.9; Supplementary European Search Report dated Apr. 21, 2021.

*Primary Examiner* — Dana Ross
*Assistant Examiner* — Joseph W Iskra
(74) *Attorney, Agent, or Firm* — Fitch, Even, Tabin & Flannery LLP

(57) ABSTRACT

A tack welding method and a tack welding apparatus that can improve the strength of a tack-welded joint portion and reduce the height of a reinforcement bead is provided. A tack welding method of the present embodiment is a tack welding method of tack-welding a part of a joint portion of a first joint and a second joint at a predetermined interval before (Continued)

main welding. In the tack welding method, a filler metal is supplied to the joint portion, laser light is deflected and irradiated to the joint portion, and the filler metal is cut with the laser light to be welded to the joint portion.

4 Claims, 5 Drawing Sheets

(58) Field of Classification Search
USPC .................................................... 219/121.64
See application file for complete search history.

(56) References Cited

FOREIGN PATENT DOCUMENTS

| CN | 105149786 A | 12/2015 |
|---|---|---|
| JP | 61-119392 A | 6/1986 |
| JP | H10-272584 A | 10/1998 |
| JP | 2002-283078 A | 10/2002 |
| JP | 2004255410 A | 9/2004 |
| JP | 2015-212205 A | 11/2015 |
| JP | 2016-150349 A | 8/2016 |
| WO | 98/43775 A1 | 10/1998 |

* cited by examiner

TACK WELDING METHOD AND TACK WELDING APPARATUS

CROSS-REFERENCE TO RELATED APPLICATIONS

This application is a U.S. national phase application filed under 35 U.S.C. § 371 of International Application PCT/JP2018/031086, filed Aug. 23, 2018, which is based upon and claims the benefit of priority from the prior Japanese Application No. 2017-160780, filed Aug. 24, 2017.

Field of the Invention

The present invention relates to a tack welding method and a tack welding apparatus, and in particular, to a tack welding method and a tack welding apparatus that enable main welding to be performed efficiently after tack welding.

Background of the Invention

For example, a boom that is a component of a crane vehicle, an aerial work vehicle, a bridge inspection vehicle or the like is a long steel structure having a hollow tubular shape. In recent years, such a boom is formed into a long tubular shape by butt-welding both open end portions of steel materials having a substantially U-shaped cross section.

In long or large steel structures such as the boom, when a welding distance is long, a plurality of locations on a weld line are commonly tack-welded in order to prevent deformations and displacements due to a heat input during welding. For example, Patent Literature 1 discloses tack welding using MIG welding, tack welding using laser welding, and tack welding using hybrid welding that combines laser welding and arc welding.

CITATION LIST

Patent Literature

Patent Literature 1: JP 2002-172477 A

SUMMARY OF INVENTION

However, when arc welding such as MIG welding or MAG welding is used for tack welding, a reinforcement bead tends to increase, causing a welding apparatus to move irregularly or stop during main welding. It is conceivable to machine the bead to such an extent that the main welding is not affected, but in this case, the number of work steps increases. Moreover, in the main welding, a sufficient penetration depth cannot be obtained in a tack welded portion, and thus the tack welded portion is poorly welded.

Meanwhile, when laser welding is used for tack welding, the strength of a joint portion is low, and thus the joint portion is broken during conveyance or welding in a large steel structure. In particular, when the welding distance is long as in the large steel structure, a gap is usually present between the joints, and a base material cannot be sufficiently heated and melted by the laser welding.

The present invention has been achieved in view of the above problems, and an object of the invention is to provide a tack welding method and a tack welding apparatus that can improve the strength of a tack-welded joint portion and reduce the height of a reinforcement bead.

According to the present invention, there is provided a tack welding method of tack-welding a part of a joint portion of a first joint and a second joint at a predetermined interval before main welding. The tack welding method includes supplying a filler metal to the joint portion, irradiating laser light to the joint portion while deflecting the laser light, and cutting the filler metal with the laser light to be welded to the joint portion.

In the tack welding method, the filler metal may be supplied to the joint portion while being pressed in a state where the filler metal is inclined by a predetermined angle.

In the tack welding method, the laser light may be horizontally irradiated with the first joint and the second joint disposed vertically.

The first joint may be constituted by both end portions of a cross section of a steel material having a substantially U-shaped or substantially semicircular cross section, and the second joint may be constituted by a steel material having a cross section including both end portions facing the both end portions of the first joint. In the tack welding method, two joint portions on left and right sides of the steel material may be simultaneously tack-welded.

According to the present invention, there is provided a tack welding apparatus that tack-welds a part of a joint portion of a first joint and a second joint at a predetermined interval before main welding. The tack welding apparatus includes a filler metal supply device that supplies a filler metal to the joint portion and a laser welding device that irradiates laser light to the joint portion while deflecting the laser light.

According to the tack welding method and the tack welding apparatus of the present invention described above, the filler metal is supplied to a laser welded portion using not arc welding but only laser welding. Consequently, a weld metal can be added to the joint portion to be tack-welded and the strength of the tack-welded joint portion can be improved. Further, as the laser light is irradiated while being deflected in the present invention, the weld metal can be dispersed while the filler metal is cut, and the height of a reinforcement bead can thus be reduced.

BRIEF DESCRIPTION OF DRAWINGS

FIG. 1A is a cross-sectional view of a joint portion and FIG. 1B is a front view of the joint portion.

FIG 2A is a plan view and FIG. 2B is a side view.

FIG. 3A illustrates a first modification, FIG. 3B illustrates a second modification, FIG 3C illustrates a third modification, and FIG. 4D illustrates a fourth modification.

FIG. 4A illustrates a comparative example, FIG. 4B illustrates a first test piece, and FIG. 4C illustrates a second test piece.

DETAILED DESCRIPTION OF THE PREFERRED EMBODIMENTS

Figure 1A:
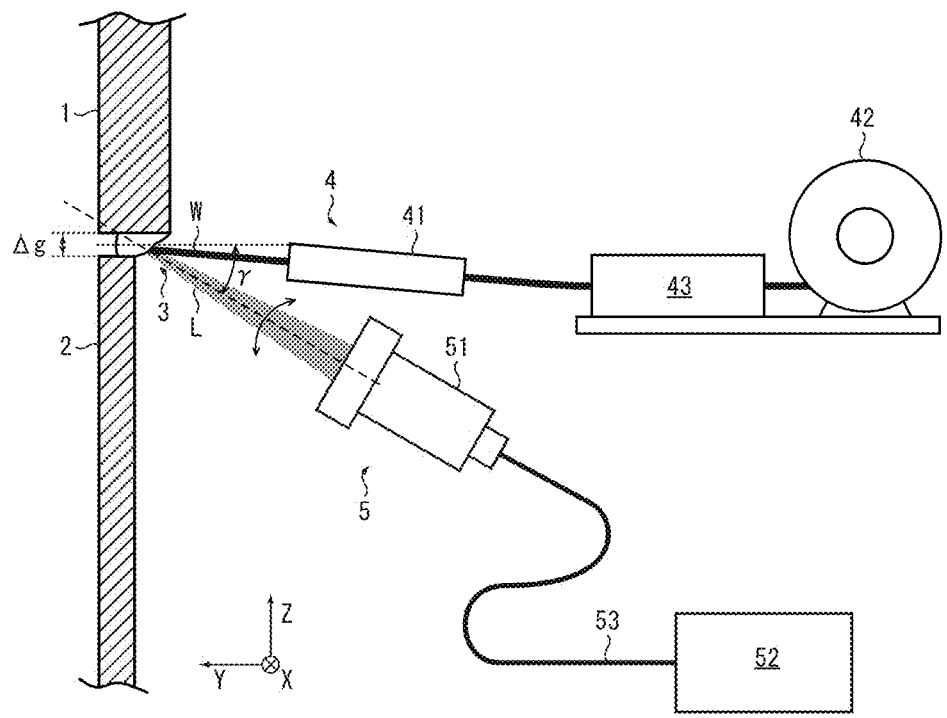
FIGS. 1A and 1B are explanatory views illustrating a tack welding method according to an embodiment of the present invention, where
Figure 1B:
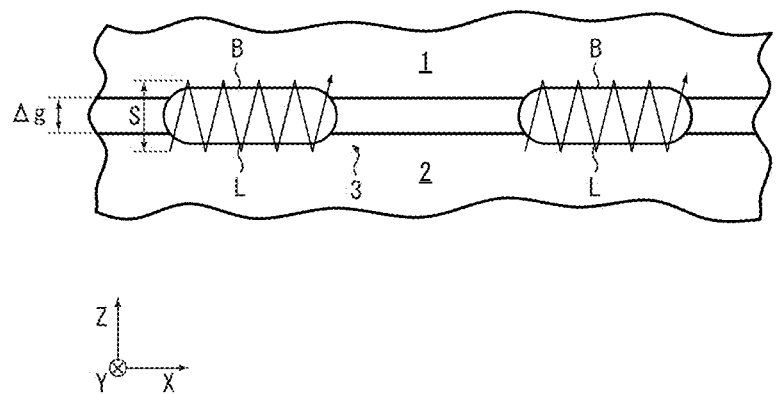
Figure 2A:
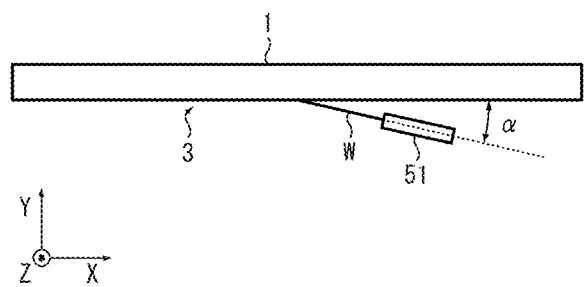
FIGS. 2A and 2B are views illustrating an example of a method of supplying a filler metal illustrated in FIGs. 1A and 1B, where
Figure 2B:
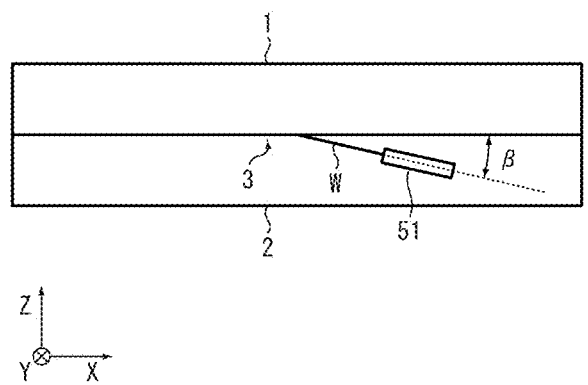

Hereinafter, an embodiment of the present invention will be described with reference to FIG. 1A to FIG. 5. FIGS. 1A and 1B are explanatory views illustrating a tack welding method according to an embodiment of the present invention, where FIG 1A is a cross-sectional view of a joint portion and FIG. 1 B is a front view of the joint portion. FIGS. 2A and 2B are views illustrating an example of a method of supplying a filler metal illustrated in FIGS. 1A and 1B, where FIG. 2A is a plan view and FIG 2B is a side view.

As illustrated in FIGS. 1A and 1B, a tack welding method of the present embodiment is a tack welding method of tack-welding a part of a joint portion 3 of a first joint 1 and a second joint 2 at a predetermined interval before main welding. In the tack welding method, a filler metal W is supplied to the joint portion 3, laser light L is deflected and irradiated to the joint portion 3, and the filler metal W is cut with the laser light L to be welded to the joint portion 3.

In the present specification, as illustrated in FIG. 1A and FIG. 1B, an X axis is set in a direction that the joint portion 3 extends, a Y axis is set in a horizontal direction perpendicular to the X axis, and a Z axis is set in a vertical direction.

The first joint 1 and the second joint 2 are, for example, steel plates having a predetermined shape. As illustrated in FIG. 1A, the first joint 1 and the second joint 2 are tack-welded with the second joint 2 disposed downward and the first joint 1 disposed upward. While a case where a plate thickness of the first joint 1 is larger than a plate thickness of the second joint 2 is illustrated, the plate thickness of the first joint 1 may be equal to the plate thickness of the second joint 2, or the plate thickness of the second joint 2 may be larger than the plate thickness of the first joint 1.

As the first joint 1 and the second joint 2 are formed of a steel plate, not a few machining errors and deformations are included in these joints. In some cases, a gap Δg is formed in the joint portion 3 in the Z axis direction. In the present embodiment, even when the joint portion 3 has the gap Δg, tack welding can be performed by supplying the filler metal W. The gap Δg is preferably equal to or less than a predetermined threshold (for example, about 1 mm to 2 mm) at a time of tack welding.

The filler metal W is, for example, a welding wire. As illustrated in FIG. 1A, the filler metal W is supplied to the joint portion 3 by a filler metal supply device 4. The filler metal supply device 4 includes, for example, a guide member 41 that maintains an orientation of the filler metal W, a welding wire drum 42 in which the filler metal W (welding wire) is wound in a coil shape, and a welding wire feeding device 43 that feeds the filler metal W from the welding wire drum 42 to the guide member 41. Although not illustrated, the filler metal supply device 4 may include a fixing unit that fixes the guide member 41 at a predetermined position.

For example, the laser light L is irradiated to the joint portion 3 by a laser welding device 5 as illustrated in FIG. 1A. The laser welding device 5 includes, for example, a laser scan head 51 that deflectably irradiates the laser light L, a laser oscillator 52 that generates laser light, and an optical fiber 53 that transports laser light from the laser oscillator 52 to the laser scan head 51. Although not illustrated, the laser welding device 5 may include a fixing unit that fixes the laser scan head 51 at a predetermined position.

As illustrated in FIG. 2A, the filler metal W is supplied in a state of being inclined to the Y axis direction by a predetermined angle α with respect to the joint portion 3 extending in the X axis direction. In the present specification, this angle α is referred to as "approach angle" of the filler metal W. In the tack welding method according to the present embodiment, the filler metal W supplied to the joint portion 3 is cut with the laser light L and welded. Consequently, when the approach angle α is increased, a distance between the cut filler metal W and the joint portion 3 is increased, and thus the degree of welding of the filler metal W may be degraded. The filler metal W is thus preferably supplied in a state of being as close to the joint portion 3 as possible. The approach angle α is set in a range of $0° < α ≤ 10°$, for example.

In addition, as illustrated in FIG. 2B, the filler metal W is supplied in a state of being inclined from a side of the second joint 2 to the Z axis direction by a predetermined angle β with respect to the joint portion 3. In the present specification, this angle β is referred to as "inclination angle" of the filler metal W. This inclination angle β is changed depending on conditions such as the plate thickness of the first joint 1 and the second joint 2. For example, as illustrated in FIG. 1A, when the plate thickness of the first joint 1 disposed on the upper side is larger than the plate thickness of the second joint 2 disposed on the lower side, the filler metal W is supplied to the joint portion 3 from the lower side. Further, when the plate thickness of the first joint 1 is equal to the plate thickness of the second joint 2, the inclination angle β may be set to 0°. When the plate thickness of the first joint 1 disposed on the upper side is less than the plate thickness of the second joint 2 disposed on the lower side, the filler metal W may be supplied to the joint portion 3 from the upper side.

In addition, as illustrated in FIG. 1A, the laser light L is irradiated in a state of being inclined from the side of the second joint 2 to the Z axis direction by a predetermined angle γ with respect to the joint portion 3. In the present specification, this angle γ is referred to as "irradiation angle" of the laser light L. The irradiation angle γ is changed according to the plate thickness of the first joint 1 and the second joint 2. For example, as illustrated in FIG. 1A, when the plate thickness of the first joint 1 disposed on the upper side is larger than the plate thickness of the second joint 2 disposed on the lower side, the filler metal W is supplied to the joint portion 3 from the lower side. Further, when the plate thickness of the first joint 1 is equal to the plate thickness of the second joint 2, the irradiation angle γ may be set to 0°. When the plate thickness of the first joint 1 disposed on the upper side is less than the plate thickness of the second joint 2 disposed on the lower side, the filler metal W may be supplied to the joint portion 3 from the upper side.

Further, as illustrated in FIG. 1B, the laser light L output from the laser scan head 51 is deflected in the Z direction and irradiated to the joint portion 3. The laser light L is deflected using, for example, a plurality of deflection mirrors (not illustrated) provided in the laser scan head 51. A galvano mirror that vibrates at a high speed, a rotating polygon mirror, or the like can be used as the deflection mirror.

For example, the laser light L is swung in a zigzag manner at a predetermined cycle in the Z axis direction, as illustrated in FIG. 1B. In the present specification, a trajectory of the laser light L is referred to as "oscillation". As illustrated in FIG. 1B, a deflection width S of the laser light L is set to be larger than the gap Δg of the joint portion 3. Further, as illustrated in FIG. 1B, the joint portion 3 is tack-welded for a predetermined length at a predetermined interval.

By irradiating the laser light L while deflecting the laser light L in a direction different from the direction that the joint portion 3 extends, the filler metal W supplied to the joint portion 3 can be cut to be welded. Further, by deflecting the laser light L, the cut filler metal W (weld metal) can be dispersed in the joint portion 3, and the height of the reinforcement bead B can thus be reduced.

In the tack welding method according to the present embodiment, the filler metal W is supplied to a laser welded portion using not arc welding but only laser welding. Consequently, a weld metal can be added to the joint portion 3 to be tack-welded and the strength of the tack-welded joint portion 3 can be improved. In addition, since arc welding is not used, a current does not need to flow through the first joint 1 and the second joint 2 during tack welding. As a result, a wasteful heat input to a steel material can be reduced and deformations of the steel material can be prevented.

Moreover, in a case where tack welding is performed by downward arc welding, the weld metal drops downward by its own weight and the height of the reinforcement bead B on a back side may be increased. In the tack welding method according to the present embodiment, however, as the tack welding is performed in a horizontal direction, the height of the reinforcement bead B on the back side can be reduced.

Next, a modification of a method of deflecting the laser light L will be described with reference to FIG. 3. Here, FIGS. 3A to 3D are views illustrating a modification of oscillation of laser light, where FIG. 3A illustrates a first modification, FIG. 3B illustrates a second modification, FIG 3C illustrates a third modification, and FIG. 3D illustrates a fourth modification.

Figure 3A:
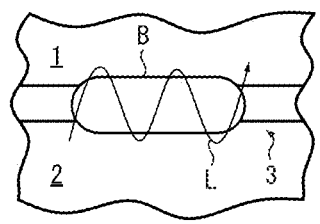
FIGS. 3A to 3D are views illustrating a modification of oscillation of laser light, where
Figure 3B:
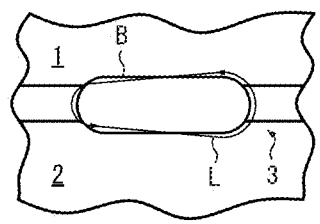

The first modification illustrated in FIG. 3A is a case where the laser light L is deflected in a substantially sine wave shape. The second modification illustrated in FIG. 3B is a case where the laser light L is deflected in a substantially elliptical shape. In this case, the deflection width on a downstream side in the welding direction may be larger than the deflection width on an upstream side. As the deflection width of the laser light L is inclined along the direction that the joint portion 3 extends, a weld metal can be effectively dispersed.

Figure 3C:
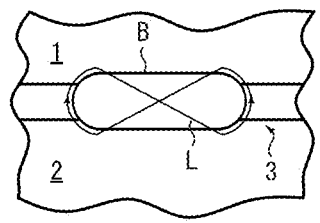
Figure 3D:
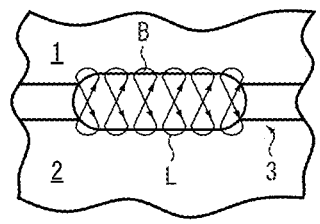

The third modification illustrated in FIG. 3C is a case where the laser light L is deflected in a horizontal-8 shape. The fourth modification illustrated in FIG. 3D is a case where the laser light L is deflected in a vertical-8 shape. In this case, the laser light L is moved along the joint portion 3 while drawing a plurality of figure 8 shapes. Note that the oscillation of the laser light L is not limited to the illustrated shapes.

The first joint 1 and the second joint 2 are tack-welded by the tack welding method according to the present embodiment described above, and then main welding is performed along the joint portion 3. In the main welding, laser arc hybrid welding using both arc welding and laser welding is used, for example. In such main welding, profile control is commonly executed on a welding apparatus along the joint portion 3. As described above, the height of the reinforcement bead B having been tack-welded by the tack welding method according to the present embodiment is reduced on the front side and the back side, and thus the bead B hardly affects the profile control. Consequently, the bead B can be skipped or directly main-welded while the profile control is executed on the welding apparatus.

Figure 4A:
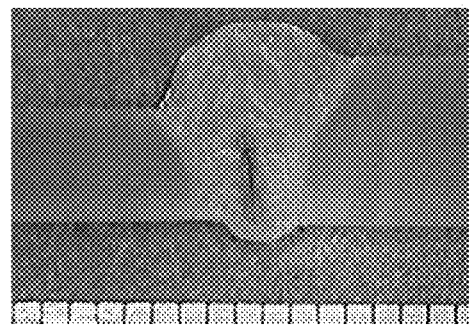
FIGS. 4A to 4C are views illustrating a cross-sectional macro of a test piece, where
Figure 4B:
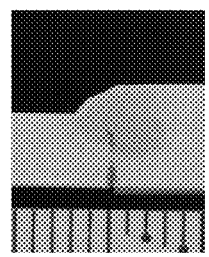
Figure 4B:
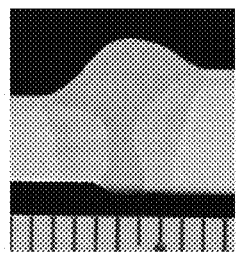
Figure 4B:
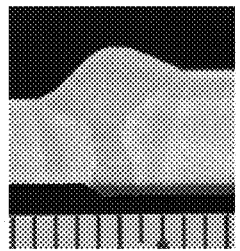
Figure 4C:
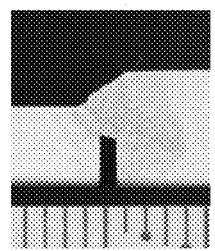
Figure 4C:
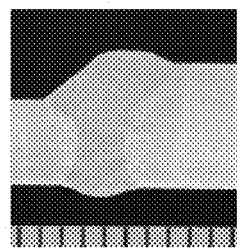
Figure 4C:
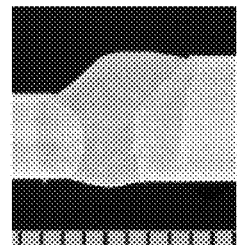

FISG. 4A to 4C are views illustrating a cross-sectional macro of a test piece, where FIG. 4A illustrates a comparative example, FIG. 4B illustrates a first test piece, and FIG. 4C illustrates a second test piece. The division of the scale is 1 mm in each figure.

The comparative example illustrated in FIG. 4A is a case where tack welding is performed by conventional arc welding and then main welding is performed by laser arc hybrid welding. When the tack welding is performed downward by arc welding, as illustrated in FIG. 4A, the height of a reinforcement bead is high on a front side and a back side. In addition, as a large amount of a weld metal is welded during tack welding in the conventional method, a sufficient penetration depth cannot be obtained during main welding, resulting in non-penetration, a thin bead on the back side, and a crack inside a joint portion. In the comparative example, profile control cannot be executed during main welding, and thus main welding is performed individually on only a tack-welded portion.

In the first test piece illustrated in FIG. 4B, a joint portion has a gap of 0 mm. In FIG. 4B, an upper figure illustrates a cross-sectional macro of a tack-welded portion, a middle figure illustrates a cross-sectional macro of the tack-welded portion that is subjected to main welding, and a lower figure illustrates a cross-sectional macro of a portion not having been tack-welded that is subjected to main welding. In the first test piece, the main welding is performed while profile control is executed.

In the second test piece illustrated in FIG. 4C, a joint portion has a gap of 1 mm. In FIG. 4C, an upper figure illustrates a cross-sectional macro of a tack-welded portion, a middle figure illustrates a cross-sectional macro of the tack-welded portion that is subjected to main welding, and a lower figure illustrates a cross-sectional macro of a portion not having been tack-welded that is subjected to main welding. In the second test piece, the main welding is performed while profile control is executed.

As illustrated in the upper figures of FIG. 4B and FIG. 4C, regardless of where a gap is present in the joint portion, the height of a reinforcement bead at the tack-welded joint portion on the front side and the back side is lower than the height of the reinforcement bead in the comparative example illustrated in FIG. 4A. In the first test piece and the second test piece, the bead is not formed to the back side of the joint portion. However, a filler metal is added during laser welding, and thus the bead has sufficient strength.

As illustrated in the middle figures of FIG. 4B and FIG. 4C, the bead can be formed in the tack-welded portion as much as the bead formed in the case where the portion not having been tack-welded is subjected to main welding as illustrated in the lower figures of FIG. 4B and FIG. 4(C). In addition, a sufficient penetration depth can be obtained in the tack-welded portion during main welding, and it is found that non-penetration is not present, a thin bead is not formed on the back side, and a crack is not formed inside the joint portion.

Figure 5:
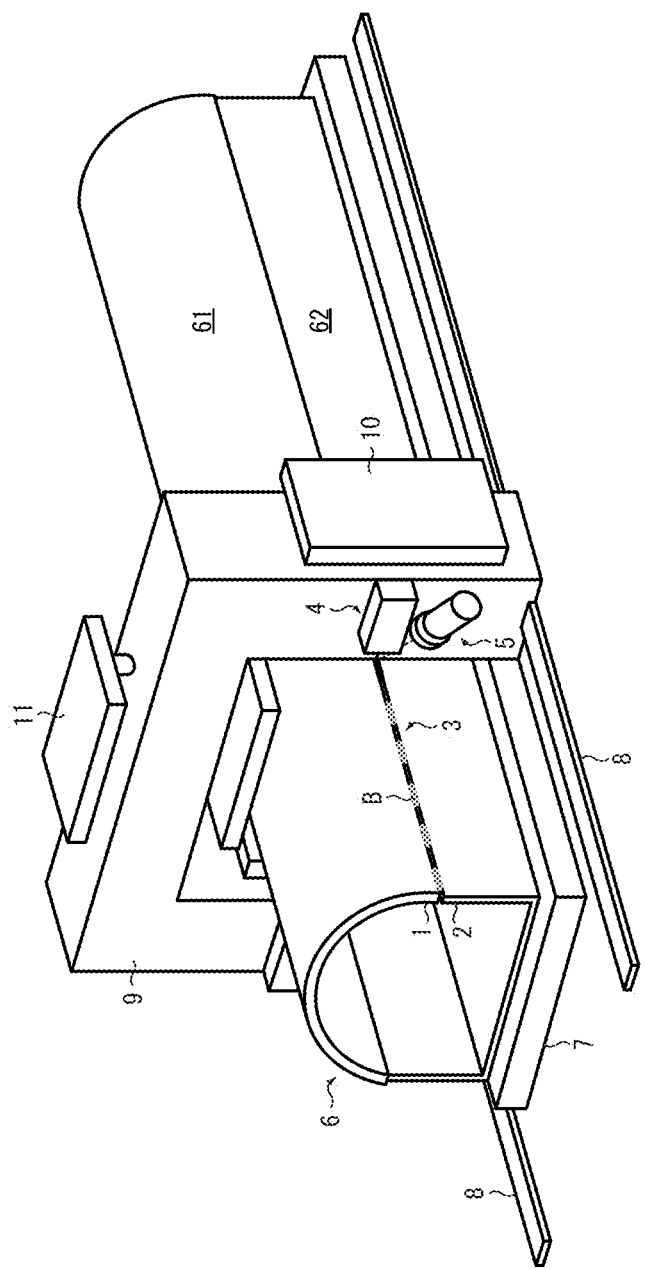
FIG. 5 is a perspective view illustrating a tack welding apparatus according to an embodiment of the present invention.

Next, a tack welding apparatus according to an embodiment of the present invention will be described. Here, FIG. 5 is a perspective view illustrating the tack welding apparatus according to an embodiment of the present invention. In each figure, the filler metal supply device 4 and the laser welding device 5 are simplified.

A workpiece 6 to be tack-welded is a tubular steel material such as a boom or a jib used for a crane vehicle and an aerial work vehicle, for example. The workpiece 6 in an orientation in use is vertically divided into two portions. An upper workpiece 61 has a round U-shaped (or substantially semi-circular) cross section, and a lower workpiece 62 has an angular U-shaped cross section. The first joint 1 is constituted by both end portions of the upper workpiece 61, and the second joint 2 is constituted by both end portions of the lower workpiece 62.

The tack welding apparatus according to the present embodiment includes the filler metal supply device 4 and the laser welding device 5 described above. The tack welding apparatus also includes a mounting table 7 that supports the workpiece 6, a pair of guide rails 8 that extend along left and right sides of the mounting table 7, and a movement unit 9 that has a gate shape and moves along the guide rails 8.

The filler metal supply device 4 and the laser welding device 5 are disposed on the left and right sides of the movement unit 9 as illustrated in FIG. 5. The welding wire drum that constitutes the filler metal supply device 4 and the laser oscillator that constitutes the laser welding device 5 may be mounted on the movement unit 9, or may be disposed on a floor separately from the movement unit 9.

The movement unit 9 may include a pair of pressing devices 10 that press the workpiece 6 inward from the left and right sides and a pressing device 11 that presses the workpiece 6 downward from an upper side. As the pressing devices 10 and 11 are disposed, the workpiece 6 can be positioned during tack welding, a gap in the joint portion 3 can be set to a minimum value, and the tack welding can be effectively performed.

The workpiece 6 is set on the mounting table 7 with the first joint 1 of the upper workpiece 61 and the second joint 2 of the lower workpiece 62 abutting each other. The movement unit 9 is then moved to a predetermined position, the workpiece 6 is positioned by the pressing devices 10 and 11, and tack welding is performed simultaneously on the left and right sides by the tack welding method described above. After tack welding, the pressing devices 10 and 11 are released, the movement unit 9 is moved again to the predetermined position, the workpiece 6 is positioned, and tack welding is performed on the workpiece 6. This process is repeated.

With such a tack welding apparatus, the joint portions 3 on the left and right sides of the workpiece 6 can be tack-welded simultaneously, and thus a processing time of a tack welding process can be reduced. The shape of the workpiece 6 is not limited to the illustrated shape, and, for example, a hollow steel material having a substantially quadrangular prism shape used for a column of a steel structure or the like, or a hollow cylindrical steel material used for a pipe or the like may be used.

A case where the joint portion 3 is provided on the left and right sides of the workpiece 6 has been described. However, tack welding can also be performed by the tack welding apparatus described above in a case where the joint portion 3 is provided on only one of the left and right sides of the workpiece 6. In this case, only one of units of the filler metal supply device 4 and the laser welding device 5 disposed on the movement unit 9 may be used, or the filler metal supply device 4 and the laser welding device 5 on a side where tack welding is not performed may be removed from the movement unit 9.

The present invention is not limited to the embodiment described above, and various modifications can be made without departing from the spirit of the present invention, for example, main welding can be applied not only to butt-welding but also to fillet welding.

The invention claimed is:

1. A tack welding method of tack-welding a part of a joint portion of a first joint and a second joint at a predetermined interval before main welding, the tack welding method comprising:
    disposing the second joint which has a smaller plate thickness than that of the first joint below the first joint which has a larger thickness than the second joint and is disposed above the first joint,
    positioning the first joint and the second joint in a state where an end portion of the first joint and an end portion of the second joint are abutted to form a step of the joint portion located at a front side to be tack welded,
    supplying a filler metal to the step of the joint portion while the joint portion is being pressed along with the filler metal and in a state where the filler metal is inclined by a predetermined angle, setting a deflection width of laser light to be larger than a gap $\Delta g$ in the joint portion, irradiating laser light sideways to the joint portion while deflecting the laser light, and cutting the filler metal with the laser light to be welded to the joint portion.

2. The tack welding method according to claim 1, wherein the first joint is constituted by both end portions of a cross section of a steel material having a substantially U-shaped or substantially semicircular cross section, and the second joint is constituted by a steel material having a cross section including both end portions facing the both end portions of the first joint.

3. The tack welding method according to claim 2, wherein two joint portions on left and right sides of the steel material are simultaneously welded.

4. A tack welding apparatus that tack-welds a part of a joint portion of a first joint and a second joint at a predetermined interval before main welding, the tack welding apparatus comprising:
    a filler metal supply device that supplies a filler metal to the joint portion; and
    a laser welding device that irradiates laser light to the joint portion while deflecting the laser light,
    a mounting table that supports a first workpiece that has the first joint and a second workpiece that has the second joint,
    a pair of guide rails that extend along left and right side of the mounting table,
    a movement unit that has a gate shape and moves along the guide rails, wherein
    the filler metal supply device and the laser welding device are disposed on the movement unit,
    the movement unit includes a pair of first pressing devices that press the first workpiece and the second workpiece inward from the left and right sides and a second pressing device that presses the upper workpiece and the lower workpiece downward from an upper side, wherein
    the mounting table, the first pressing device, and the second pressing devise are used to dispose the second workpiece including the second joint which has a smaller plate thickness than that of the first joint below the first joint and dispose the first workpiece including the first joint which has a larger plate thickness than that of the second joint above the second joint, the first joint and the second joint are positioned in a state where an end portion of the first joint and an end portion of the second joint are abutted to form a step of the joint portion located at a front side to be tack welded,
    wherein the laser welding device is configured so that the deflection width of the laser beam can be set larger than a gap $\Delta g$ of the joint portion, and
    wherein the filler metal supply device is configured to supply a filler metal to the step of the joint portion while the joint portion is being pressed along with the filler metal and in a state where the filler metal is inclined by a predetermined angle.

* * * * *